(12) United States Patent
Meier (10) Patent No.: US 10,260,660 B2
(45) Date of Patent: Apr. 16, 2019

(54) MULTI-WALLED PIPE AND MANUFACTURE THEREOF

(71) Applicant: TI Automotive (Heidelberg) Gmbh, Heidelberg (DE)

(72) Inventor: Sebastian Meier, Bruchsal (DE)

(73) Assignee: TI AUTOMOTIVE (HEIDELBERG) GMBH, Heidelberg (DE)

( * ) Notice: Subject to any disclaimer, the term of this patent is extended or adjusted under 35 U.S.C. 154(b) by 544 days.

(21) Appl. No.: 14/928,000

(22) Filed: Oct. 30, 2015

(65) Prior Publication Data

US 2016/0131282 A1   May 12, 2016

(30) Foreign Application Priority Data

Nov. 6, 2014 (EP) .................................. 14192106

(51) Int. Cl.
| | | |
|---|---|---|
| F16L 9/14 | (2006.01) | |
| F16L 9/02 | (2006.01) | |
| B21C 37/09 | (2006.01) | |
| B21C 37/15 | (2006.01) | |
| C25D 5/02 | (2006.01) | |
| C25D 5/08 | (2006.01) | |
| F16L 9/17 | (2006.01) | |
| C25D 3/12 | (2006.01) | |
| C25D 5/12 | (2006.01) | |
| C25D 5/50 | (2006.01) | |
| C25D 7/06 | (2006.01) | |
| C25D 17/00 | (2006.01) | |

(52) U.S. Cl.
CPC ............... *F16L 9/02* (2013.01); *B21C 37/09* (2013.01); *B21C 37/154* (2013.01); *C25D 3/12* (2013.01); *C25D 5/028* (2013.01); *C25D 5/08* (2013.01); *C25D 5/12* (2013.01); *C25D 5/50* (2013.01); *C25D 7/0621* (2013.01); *C25D 7/0635* (2013.01); *C25D 7/0642* (2013.01); *C25D 17/00* (2013.01); *F16L 9/17* (2013.01)

(58) Field of Classification Search
CPC ....................................... F16L 9/02; F16L 9/17
USPC ................... 138/134, 131, 135, 146
See application file for complete search history.

(56) References Cited

U.S. PATENT DOCUMENTS 3,911,177 A * 10/1975 Humbert ................. C23C 14/16
427/250
4,661,230 A     4/1987 Podrino
(Continued)

FOREIGN PATENT DOCUMENTS

| | | |
|---|---|---|
| EP | 1 488 865 A1 | 12/2004 |
| GB | 1 591 907 A | 7/1981 |
| WO | 2004/037454 A2 | 5/2004 |

OTHER PUBLICATIONS

European Patent Office, International Search Report in European Patent Application No. 14 19 2106 (dated Apr. 21, 2015).

*Primary Examiner* — James Hook
(74) *Attorney, Agent, or Firm* — Brinks Gilson & Lione (57) ABSTRACT

A multi-walled pipe and a method for its manufacture involves a steel sheet forming a steel source layer to which a nickel source layer is applied on at least one or both sides. A solder source layer is applied to the one nickel source layer, or one of the two, or both, nickel source layers. The multi-walled pipe is formed from a strip of the coated metal sheet by rolling. The walls of the pipe are soldered by heating. In one form, the heating takes place by radiation. In another, it takes place by induction.

7 Claims, 5 Drawing Sheets

(56) References Cited

U.S. PATENT DOCUMENTS

| | | | | |
|---|---|---|---|---|
| 5,277,228 | A * | 1/1994 | Yamanashi | C25D 5/10 |
| | | | | 138/140 |
| 5,553,640 | A * | 9/1996 | Ferenczy | B21C 37/06 |
| | | | | 138/137 |
| 5,904,966 | A * | 5/1999 | Lippens | B22F 7/06 |
| | | | | 204/298.12 |
| 6,500,565 | B2 * | 12/2002 | Usui | F16L 58/1054 |
| | | | | 138/146 |
| 2005/0271896 | A1 * | 12/2005 | Stahn | F16L 9/04 |
| | | | | 428/685 |
| 2009/0038704 | A1 * | 2/2009 | Sausner | B21C 37/09 |
| | | | | 138/143 |
| 2015/0167131 | A1 * | 6/2015 | Bullard | C22C 38/18 |
| | | | | 428/610 |

* cited by examiner

MULTI-WALLED PIPE AND MANUFACTURE THEREOF

CROSS-REFERENCE TO RELATED APPLICATIONS

This application claims priority pursuant to Title 35 U.S.C. § 119(b) to EP Application No. 14 192 106.4 filed Nov. 6, 2014, entitled Multi-Walled Pipe and Manufacture Thereof.

BACKGROUND OF DISCLOSURE

The invention relates to a method for manufacturing multi-walled pipes and the multi-walled pipe, manufactured according to the method.

The manufacturing of the pipes specified above is fundamentally known. A steel sheet is coated on one or both sides with a solder layer of copper. The steel sheet forms a steel source layer and the copper forms one or two solder source layers of a coated metal sheet. The coated metal sheet, or strips of the sheet, are subsequently rolled up multiple times. In a final step, the copper is melted by heating the multi-walled pipe, by means of which the rolled up walls of the pipe become soldered and thus a high quality, material-bonded connection is obtained. Pipes manufactured in this manner are very robust on one hand, and relatively economical to manufacture on the other hand.

A substantial problem with this method concerns the coating of the steel sheet with the solder layer, for example. This is because, for a large-scale coating, as in the case of steel sheets, electroplating (referred to as galvanic technology) is used predominantly. A sufficient adhesion of the solder layer to steel is achieved from an economical perspective, however, solely and exclusively through the addition of cyanide to the electrolyte baths for the electroplating. A number of approaches have existed for improving the adhesion of the solder layer in order to avoid the addition of the extremely poisonous cyanide to the electrolyte baths. Every one of these approaches, however, is accompanied by disadvantages, such that in the overall assessment, the known method of adding cyanide has prevailed so far. These disadvantages are, for example, an insufficient adhesion, a too high susceptibility of the electrolyte baths to contaminants, the addition of dangerous strong oxidants, or process steps that are far too complex. All of these disadvantages result in either a poor quality of the pipe (in particular the poor adhesion of the solder layer) or uneconomical methods.

SUMMARY OF DISCLOSURE

The invention thus addresses the object of providing a method without cyanide, in which the aforementioned disadvantages are avoided. In particular, the invention addresses the technical problem of providing a very economical and cyanide-free method, which, at the same time, ensures a good adhesion of the solder layer to the steel sheet.

In order to solve this technical problem, the invention teaches a method for manufacturing multi-walled pipes, in particular pipes according to the invention described further below, wherein a steel sheet forms a steel source layer of a metal sheet, wherein a nickel source layer is applied to at least one side of the steel source layer, wherein a solder source layer is applied to the one nickel source layer or one of the two nickel source layers. The multi-walled pipe is made from the metal sheet, in particular from sections of the metal sheet referred to herein as metal strips, by means of rolling, and wherein the walls of the pipes are soldered by heating.

The term "metal sheet" relates to the coating stages, and metal strip refers to the pipe forming stages. Accordingly, this term refers to the simple steel sheet as well as the sheet in each further coating stage.

The steel sheet preferably exhibits a width of 250 mm to 1,500 mm, and particularly preferably of 700 mm to 1,100 mm. The metal sheet ideally correlates to the steel types DC or DX. Very particularly preferably, the metal sheet is composed of the steels DC03 or DC04. The thickness of the metal sheet, and thus the thickness of the steel source layer amounts to 150 to 600 µm (Micrometer or micron) for practical purposes, preferably 250 to 420 µm, and particularly preferably 300 to 370 µm. Prior to the application of the nickel source layer(s), the steel sheet is advantageously cleaned. The designations DC03 and DC04 are steel grades of the European standard EN-10130. "DC" is a generalization of DC03, DC04 and other DC XX steel grades. "D" means suitable for cold forming. "C" means hot rolled, and "X" means hot or cold rolled.

The thickness of the nickel source layer is preferably 40 to 800 nm (nanometer), particularly preferably 60 to 300 nm, and very particularly preferably 70 to 200 nm. The thickness of the solder source layer, in contrast, is preferably 2 to 12 µm, more preferably 3 to 8 µm, and very particularly preferably 4 to 6 µm.

The rolling of the strips preferably occurs by means of rollers. Advantageously, the metal can be shaped when cold, for practical purposes. The heating occurs, according to a first embodiment, by means of radiation ovens (also referred to as muffle furnaces). According to other embodiments, the heating occurs by means of induction ovens or by means of the application of a high-frequency current to the pipe itself.

The term "nickel source layer" refers to pure nickel layers as well as nickel alloys. Preferably, the nickel portion of the nickel source layer corresponds to a relative maximum. Particularly preferably, the nickel portion of the nickel source layer corresponds to an absolute maximum. Very particularly preferably, the nickel portion amounts to at least 80%.

The term "solder source layer" comprises metal and metal alloys suitable for soldering. The solder source layer preferably has at least one of the metals from the group "lead, tin, zinc, silver, copper." Preferably, the at least one solder source layer comprises at least one brazing solder. Brazing solders, as set forth in the invention, are metals having softening temperatures above 450° C.

It is within the scope of the invention that the at least one nickel source layer and/or the at least one solder source layer are applied by means of electroplating. For practical purposes, at least one electrolyte bath is used during the electroplating of the at least one nickel source layer and/or the at least one solder source layer.

According to a preferred embodiment, the electroplating of the at least one nickel source layer and/or the at least one solder source layer is carried out in at least one cell having the possibility of maintaining a constant electrolyte flow rate. The cell having the possibility of maintaining a constant electrolyte flow rate is advantageously a radial cell. According to another embodiment, the cell having the possibility of maintaining a constant electrolyte flow rate is a cell having movable anodes. Particularly preferably, the cell having movable anodes is a so-called Gravitel cell.

According to a first embodiment, the radial cell coats the metal or steel sheet on only one side. According to a second embodiment, the Gravitel cell coats the steel sheet on both sides. The Gravitel cell preferably applies a nickel source layer to both sides of the steel sheet. The use of at least one cell having the possibility of maintaining a constant electrolyte flow rate is based on the knowledge that, by this means, a uniform current density is ensured over the entire cell. This enables, in particular, a particularly uniform distribution of nickel. As a result, it is thus possible to obtain very thin nickel source layers.

The electroplating of the at least one solder source layer is advantageously carried out in at least one radial cell. According to a preferred embodiment, the electroplating of the at least one solder source layer is carried out in at least two radial cells and more preferably, in at least four radial cells. For practical purposes, one side of the metal sheet lies on a contact surface, such that the electrolyte bath only comes in contact with the other side of the metal sheet. The contact surface is preferably formed by a contact drum. It is preferred that the anodes are disposed at a constant, or substantially constant, spacing to the metal sheet, or the contact surface, or to the contact drum, respectively. It is appropriate that the electrolyte is introduced to the radial cell on two sides of the contact drum. Ideally, there is an electrolyte outlet in the deepest lying region of the contact drum. Preferably, the metal sheet is fed into the radial cell via a first deflection roller. The metal sheet is advantageously drawn out of the radial cell via a second deflection roller.

It is within the scope of the invention that the electroplating of the at least one nickel source layer and/or the at least one solder source layer is carried out using passive anodes. The passive anodes preferably include lead or a lead alloy. The lead alloy preferably contains silver or tin. According to another embodiment, the passive anodes comprise titanium with a coating such as ruthenium, platinum or iridium, for example, as the coating.

According to a preferred embodiment, the electroplating of the at least one nickel source layer is carried out with a current density between 50 and 550 A/dm$^2$ (amperes per decimeter squared), preferably between 80 and 350 A/dm$^2$, and particularly preferably between 80 and 220 A/dm$^2$. The electrolyte bath preferably contains sulfuric acid. The portion of sulfuric acid amounts to 1 to 20 g/l, preferably 2 to 13 g/l (grams per liter), and particularly preferably 4 to 8 g/l. For practical purposes, the electrolyte bath includes nickel sulfate. Boric acid is preferably provided for the stabilization of the pH value in the electrolyte bath. The portion of boric acid preferably amounts to 25 to 80 g/l, particularly preferably 30 to 70 g/l, and very particularly preferably 40 to 60 g/l. According to a preferred embodiment, the electrolyte bath contains sodium sulfate in order to obtain a higher conductivity. The portion of sodium sulfate preferably amounts to 40 to 55 g/l. Advantageously, no further additives are added to the electrolyte bath, because these would otherwise result in a poorer soldering behavior. The nickel portion of the electrolyte bath advantageously corresponds to a value between 50 and 130 g/l, more advantageously 70 to 100 g/l, and particularly advantageously 80 to 90 g/l. The flow rate of the electrolyte bath preferably amounts to 1 to 10 m/min., more preferably 2 to 5 m/min., and particularly preferably 2.5 to 3.5 m/min.

It is within the scope of the invention that the electroplating of the at least one solder source layer is executed with a current density between 30 and 500 A/dm$^2$, preferably between 40 and 325 A/dm$^2$, and particularly preferably between 40 and 200 A/dm$^2$. The electrolyte bath advantageously contains sulfuric acid. The portion of sulfuric acid further advantageously amounts to 80 to 120 g/l, and particularly advantageously 90 to 110 g/l. The portion of solder in the electrolyte bath is appropriately adjusted to the portion of sulfuric acid in the electrolyte bath. The solder portion preferably corresponds to that portion in the electrolyte bath that is the maximum that can be dissolved by the sulfuric acid. Advantageously, no further additives are added to the electrolyte bath. Particularly preferably, in particular, no boric acid is added, because there is no need for further manipulation of the pH value.

It is preferred that the solder source layer comprises copper. Preferably the solder source layer is at least 30% copper, particularly preferably at least 50% copper, and very particularly preferably at least 70% copper. According to a preferred embodiment, the solder source layer is at least 90% copper.

According to a particularly preferred embodiment, one nickel source layer is applied to each side of the steel sheet or steel source layer. The nickel source layers are preferably applied with a cell having a constant electrolyte flow rate. The nickel source layers are particularly preferably applied to both sides in a cell having a constant electrolyte flow rate. The nickel source layers applied to both sides are very particularly preferably applied to the steel sheet or steel source layer in a Gravitel cell.

According to a particularly preferred embodiment, the solder source layer is applied to the one nickel source layer, or to one of the two nickel source layers on only one side of the steel source layer. The only one solder source layer preferably forms the inside of the pipe during the rolling. For practical purposes, the solder source layer is applied by means of a radial cell. The solder source layer is particularly preferably applied with a plurality of radial cells. According to a preferred embodiment, the solder source layer is applied with a least two radial cells. According to another embodiment, the solder source layer is applied by means of at least four radial cells.

It is preferred that a cleaning of the steel sheet comprises a degreasing and/or an acid cleaning. The degreasing is preferably carried out in two stages. In a first degreasing stage, the steel sheet is particularly preferably degreased in an alkaline bath, with brushes. In a second degreasing stage, the steel sheet is degreased in an alkaline bath with gas blowers. It is preferred that after each sub-stage of the degreasing, a rinsing with water, preferably a cascading rinsing with water, advantageously with brushes, occurs.

The invention also teaches of a multi-walled pipe, in particular a pipe manufactured by means of the method according to the invention, wherein the pipe is formed from at least a multi-layered metal sheet, or at least a section or strip of a multi-layered metal sheet, by rolling, wherein each wall of the pipe comprises a steel layer, which steel layer is coated on one side or both sides with a solder layer, wherein the steel layers exhibit a region having nickel concentrations increasing toward the solder layer, and wherein the solder layers exhibit a region having nickel concentrations increasing toward the steel layers.

Preferably the pipe is designed as being at least double walled. Furthermore, the walls of the multi-walled pipe are preferably formed by windings of whole numbers when rolled. The pipe is preferably soldered by means of at least one of the solder layers. The soldering causes a diffusion of the iron, nickel and solder atoms, at least in sub-regions of the pipe. This is accompanied by a melting of the sharp borders between the steel source layer, the nickel source layer(s) and the solder source layer(s) that existed prior to the soldering. For this reason, only steel, nickel and solder layers are referred to after the soldering.

The term "steel layer" means, thereby, that in this layer, the portion of iron atoms is greater than the portion of solder atoms. The term "solder layer" is defined analogously to the term steel layer. It may be the case here, that iron and solder atoms are present in the entire region of the former nickel source layer, such that there is no longer a nickel layer after the soldering, because the regions of the former nickel source layer then belong, by definition, to the steel or solder layer. A nickel layer referred to only when there are still regions in the nickel source layer that have not been permeated by iron or solder atoms, thus an original nickel source layer still exists.

Preferably the steel layer forms a steel strip. Furthermore, the steel strip preferably exhibits a steel that is soft, and in particular, is well suited for cold shaping. The steel of the steel layer, or the steel strip, respectively, is particularly preferably included in the steel types DC or DX. The steel of the steel layer, or the steel strip, respectively, is very particularly preferably included in the steels DC03 or DC04. The thickness of the steel layer is preferably 150 μm to 600 μm, more preferably 250 μm to 420 μm, and particularly preferably 300 μm to 370 μm. The solder layer preferably has a thickness of 2 μm to 12 μm, more preferably a thickness of 3 μm to 8 μm, and particularly preferably a thickness of 4 μm to 6 μm. It is within the scope of the invention that the outer diameter of the pipe amounts to 2 mm to 20 mm, preferably 3 mm to 15 mm, and very particularly preferably 4 mm to 12 mm.

According to a very particularly preferred embodiment, regions containing nickel correspond to thicknesses of the nickel source layer(s) of 40 to 800 nm, preferably 60 to 300 nm, and particularly preferably of 70 to 200 nm. The term "regions containing nickel" refers to nickel layers and/or regions having increasing nickel concentrations. The thickness of the original nickel source layer can be calculated from the integral of the nickel concentration in the region containing nickel. Thus, in order to determine the thickness of the original nickel source layer(s), it is necessary to determine the nickel concentration along the radius of the pipe.

According to a very advantageous embodiment, the innermost layer of the pipe is a solder layer. Moreover, the outermost layer of the pipe advantageously exhibits no solder. For practical purposes, the metal strip forming the basis of the pipe has the solder source layer on only one side. This means that the solder is not present on the outer surface of the pipe. This is because it has been found that when a corrosion protection is applied to the outside of the pipe, in the form of zinc, for example, the effect of the corrosion protection is reduced because of the solder. Furthermore, the solder, in conjunction with zinc, increases the brittleness of the outer surface of the pipe. This is critical for subsequent bending procedures, for example.

According to a particularly preferred embodiment, the outermost of the steel layers has a region on its outer surface having an increasing nickel concentration. For practical purposes, all of the steel layers have regions on their two boundary surfaces having nickel concentrations increasing toward the respective boundary surfaces. The basis of the pipe is preferably a metal strip, having nickel source layers on both sides. This has the advantage that the corrosion protection layer made of zinc has better characteristics. This is because, when galvanized in a zinc bath, iron atoms diffuse into the applied zinc layer, thus reducing the corrosion properties of the zinc coating. Nickel, on the other hand, prevents this diffusion, due to a higher melting temperature than that of zinc. As a result, the reciprocal diffusion of zinc and iron is reduced, and the so-called pure zinc layer (zinc layer without diffused iron atoms) is thicker. Thus, the zinc layer applied later to the outer nickel layer is improved by the nickel layer in terms of its corrosion protection properties.

Advantageously, the solder layers comprise copper. The portion of copper in the solder layer preferably amounts to at least 30%, more preferably at least 50% and particularly preferably at least 70%. In a particularly preferred embodiment, the portion of copper amounts to at least 90%.

The invention is based on the knowledge that nickel is particularly suited to function as an adhesion promoter for solder on steel, and the addition of cyanide in electrolyte baths can thus be avoided. Moreover, it has been shown that nickel and solder can also be applied in a very economical manner by means of cells having the possibility of a constant electrolyte flow rate. This is enabled, in particular, by radial cells or Gravitel cells. It has been further shown that for a particularly good adhesion promotion, the nickel source layers are advantageously very compact. This is achieved in that very high current densities are used. Passive anodes are preferred for these high current densities. Appropriate precisely balanced mixtures of the electrolyte baths are also advantageous. The invention is further based on the knowledge that nickel forms a very good diffusion barrier, which reduces the diffusion of solder atoms in the steel source layer, or steel layer, respectively. As a result, the brittleness of the steel is reduced. The pipe is thus of higher quality when subjected to subsequent bending processes. Moreover, the invention is based on the knowledge that nickel improves the properties of the corrosion protection coating made of zinc or zinc alloys. Furthermore, solder reduces the corrosion protection properties of the zinc or zinc alloys, respectively. It is thus advantageous that the solder layer forms the innermost layer of the pipe on only one side of the metal strip. As such, when applied to both sides, nickel is thus located on the outer surface of the pipe.

DESCRIPTION OF THE DRAWINGS

The invention shall be explained in greater detail below, based on the drawings depicting two exemplary embodiments of the invention.

Figure 1:
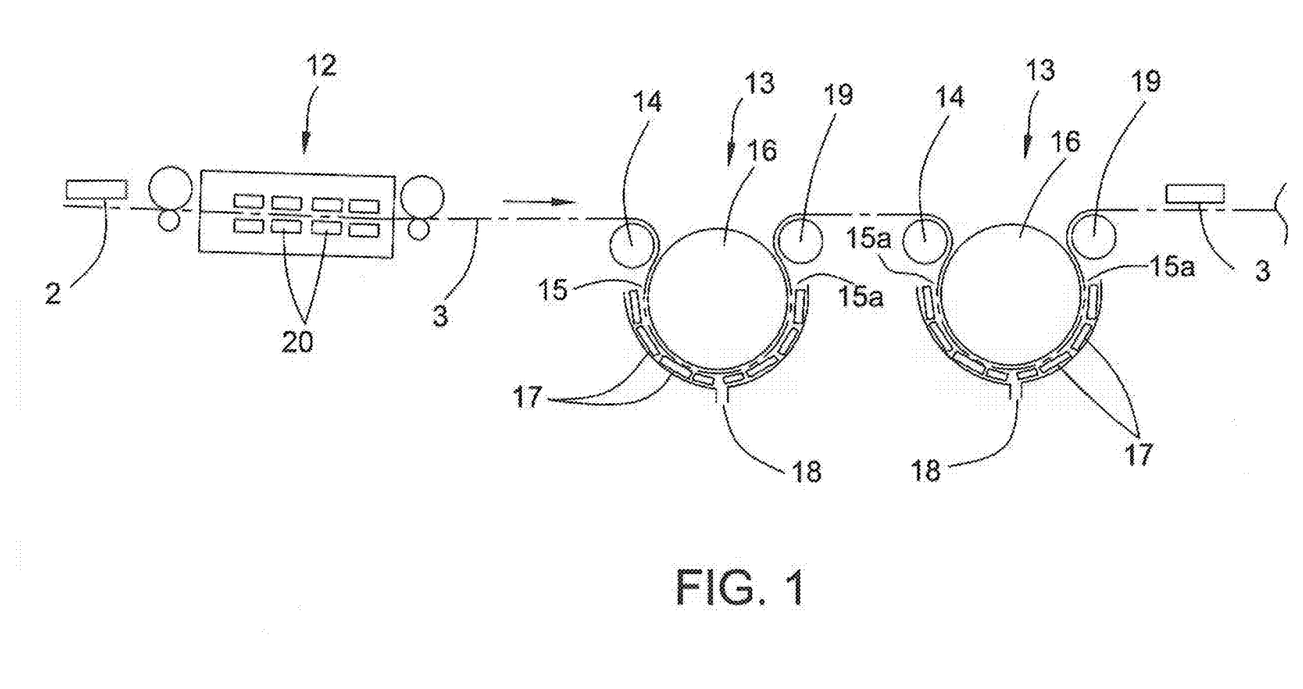
FIG. 1 is a schematic depiction of a portion of a device for manufacturing a coated metal sheet for a multi-walled pipe according to the invention.
Figure 2:
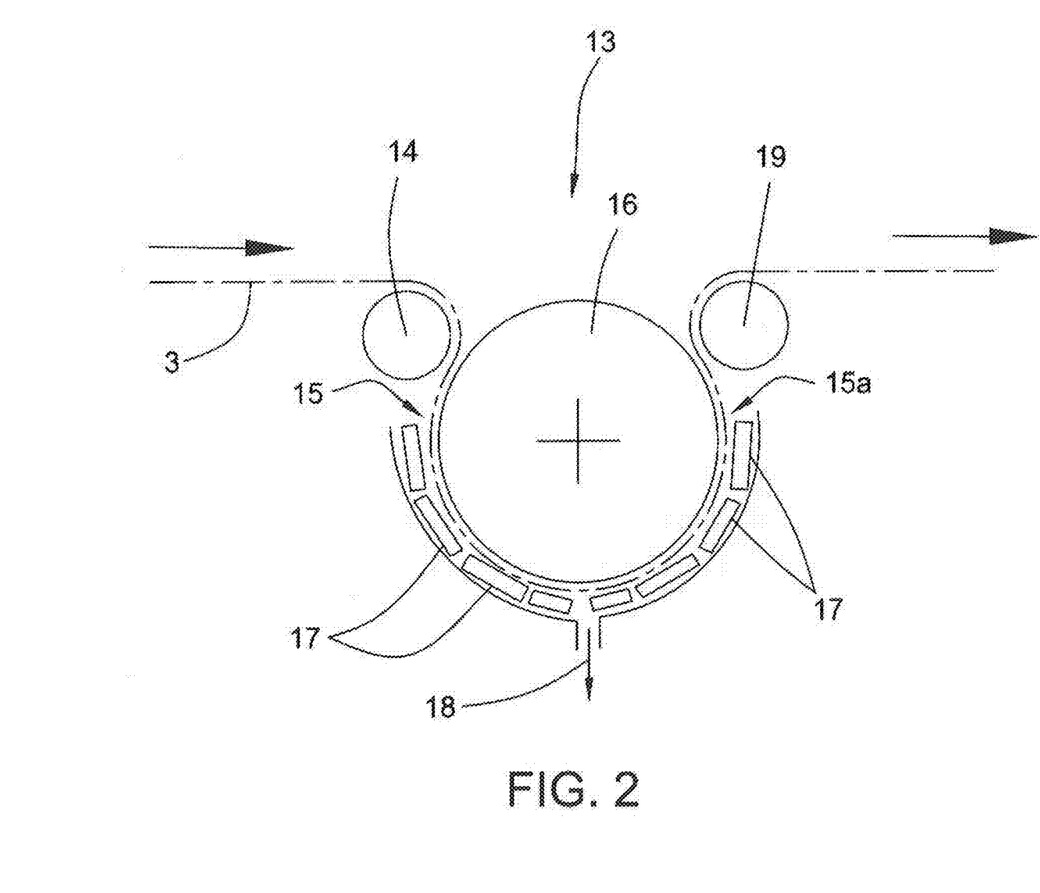
FIG. 2 is a detailed schematic detailed depiction of a radial cell 13 of the device of FIG. 1.
Figure 4:
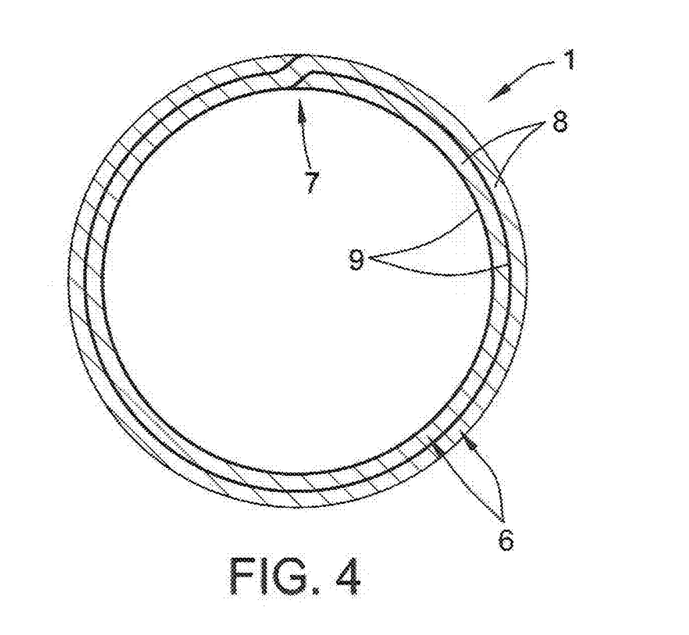
FIG. 4 shows a cross-section of the pipe according to the invention, produced from a coated metal strip of the coated metal sheet in FIG. 3.

FIGS. 1 and 2 illustrate an apparatus for carrying out the method according to the invention for manufacturing a multi-walled pipe such as seen in FIG. 4, according to the invention.

Figure 3:
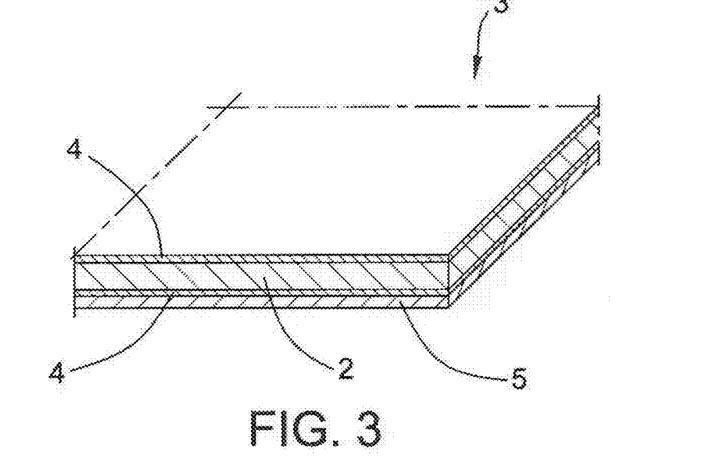
FIG. 3 shows a perspective view of the coated metal sheet manufactured with the device of FIG. 1.
Figure 5:
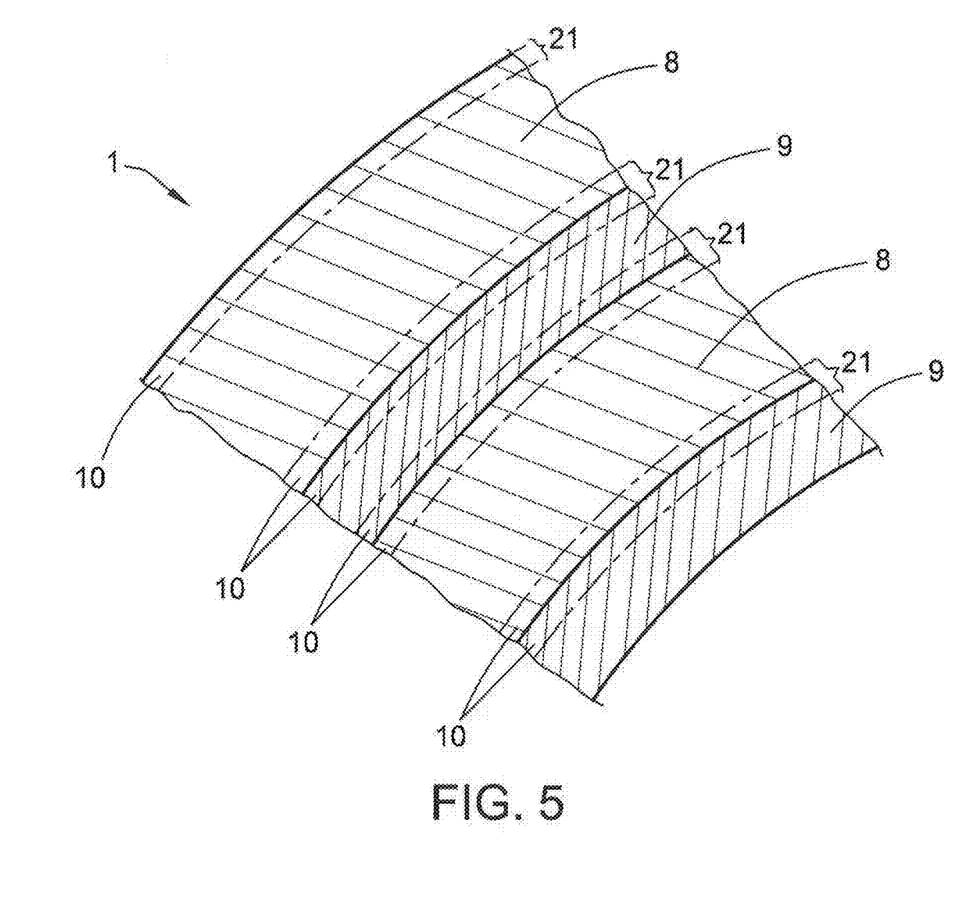
FIG. 5 shows an enlarged section of the walls of the pipe of FIG. 4 according to the invention.

FIGS. 3 to 5 illustrate the layer structure of the coated metal strip of the coated metal sheet for making a pipe according to the invention.

Figure 6:
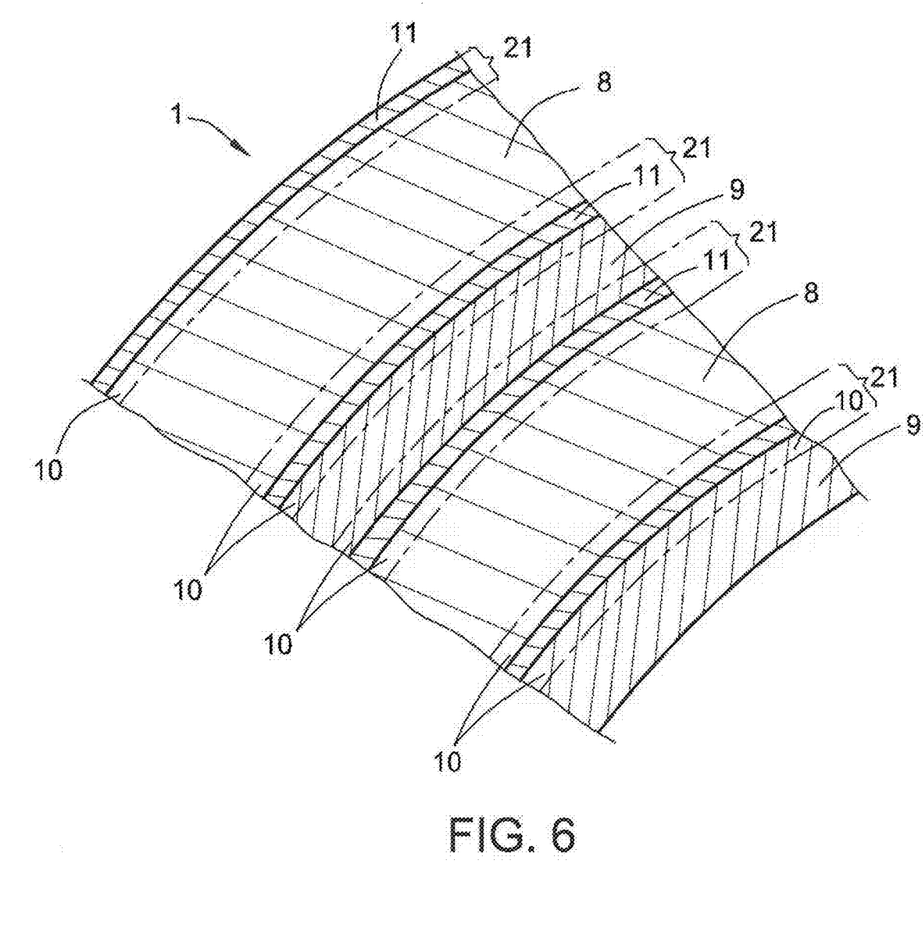
FIG. 6 shows an enlarged section of the walls of a second pipe according to the invention.

FIG. 6, lastly, illustrates the layer structure of a second pipe according to the invention.

In FIG. 1, a part of the apparatus for manufacturing a coated metal sheet 3 for the multi-walled pipe 1 according to the invention is illustrated. In this process, a steel sheet 2 serves as the source material or substrate, preferably having a width of 700 mm to 1100 mm. The steel sheet 2 forms the steel source layer of the coated metal sheet 3. The steel sheet 2 or steel source layer or substrate preferably has a thickness of 300 to 370 µm, and is composed of the steel types DC03 and DC04, which are soft and are well suited for cold forming.

The steel sheet 2 is cleaned in a first step. The cleaning comprises a two stage degreasing in an alkaline bath, wherein an appropriate grease removal is ensured, once with brushing and once with gas blowing. The steel sheet 2 is subjected to a cascade rinsing with water between the sub-stages. After the degreasing, acid cleaning with sulfuric acid is carried out, which is followed in turn by a cascading water rinsing. After the cleaning, the steel sheet 2 is ready for coating with nickel and copper.

It is visible in FIG. 1 that the steel sheet 2 first runs, from left to right, through a Gravitel cell 12 and then through two radial cells 13, one of which is shown in detail in FIG. 2. Accordingly, at the far left in FIG. 1 at the beginning of the process, is the steel sheet 2, or the steel source layer of the coated metal strip 3. A nickel coating occurs in the Gravitel cell 12, in which 70 to 200 nm nickel is applied, on both sides, to the steel sheet 2. The steel sheet is thus expanded on each of the two planar surfaces by addition of a nickel source layer 4 seen in FIG. 3.

The Gravitel cell 12 has movable anodes 20. The movable anodes 20 are passive, composed of a lead/tin alloy, and are immersed in an electrolyte bath. The current densities in the electrolyte bath preferably lie between 80 and 220 A/dm$^2$. The electrolyte bath contains sulfuric acid, wherein the sulfuric acid corresponds to 4 to 8 g/l of the electrolyte bath. Furthermore, boric acid is added to the electrolyte bath. The portion of boric acid in the electrolyte bath corresponds to 40 to 60 g/l. Moreover, a portion of 40 to 55 g/l sodium sulfate is present in the electrolyte bath. There are no further additives. The nickel portion of the electrolyte bath amounts to between 80 and 90 g/l. The flow rate of the electrolyte bath is set such that a rate of 2.5 to 3.5 m/min. is reached.

After the Gravitel cell 12, the steel sheet 2 with applied layers of nickel 4 then passes to the two radial cells 13, which apply a solder source layer 5 having at least 90% copper to the undersurface of the sheet in two stages. The overall thickness of the solder source layer 5 preferably amounts to 4 to 6 µm after the second radial cell 13. In order to more clearly illustrate the radial cells 13, an enlarged image of such a radial cell 13 is depicted in FIG. 2. The moving sheet comprised of steel sheet 2 with two nickel source layers 4, runs first over a deflection roller 14, in the upper left portion of the figure, and is then guided onto a contact drum 16. Shortly after contact with the contact drum 16, an electrolyte bath 15 is fed into the radial cell 13 at an electrolyte bath inlet. Because one planar surface of the sheet comes in contact with the contact drum 16, only the undersurface of the sheet comes in contact with the electrolyte bath. Passive anodes 17 allow the flow of solder ions to the undersurface of the sheet. The anodes 17 are oriented thereby, such that the spacing to the contact drum 16, and thus the undersurface of the strip, always remains fundamentally constant.

There is an electrolyte bath outlet 18 located at the lowest point in the radial cell 13, at which the electrolyte of the radial cell 13, which in the meantime has become relatively depleted of solder ions, is removed, and is then enriched with solder ions again, in an apparatus that is not shown. Subsequently, the steel sheet passes by a second electrolyte bath inlet 15a, counter to the current in relation to the electrolyte bath 15, and is then removed from the radial cell 13, via a second deflection roller 19. This process is repeated in the second radial cell 13, and completes the application of the solder source layer 5.

There are very high current densities, between 40 and 200 A/dm$^2$, present in the radial cells 13. The anodes 17 are passive, and comprise a lead/zinc alloy. The electrolyte bath contains 90 to 110 g/l sulfuric acid, as well as solder up to the maximum solubility. Further additives, such as boric acid, are not present.

Following the sub-stages of the solder coating, the steel strip 19 with a nickel layer 4 on each planar surface and a solder source layer 5 on one is rinsed. The production of the coated metal sheet 3 is then complete.

The coated metal sheet 3 is shown for illustrative purposes in FIG. 3 in a perspective cut-out. The steel source layer 2, having a thickness of 300 to 370 µm, the adjacent nickel source layers 4, having thicknesses of 70 to 200 nm, and the solder source layer 5 on the undersurface of the coated metal sheet 3, having a thickness of 4 to 6 µm can be readily seen. Due to the large difference between the thicknesses of the individual layers, the metal sheet in FIG. 3 is not drawn to scale.

The coated metal sheet 3 is divided into sections or strips in further process steps, which are rolled into tubes by means of rollers. In the present exemplary embodiment, the sections are rolled twice by means of rollers, such that the pipe 1 has two walls 6. After the rolling, the pipe is heated by mean of an induction oven, by means of which the solder source layer 5 is melted. In this manner, the two walls 6 are soldered to one another, and the pipe 1 is thus sealed. Due to the double winding, as well as due to the diffusion processes of the nickel, iron, and solder atoms, reference is no longer made to source layers 2, 4, 5 after the soldering, but instead, reference is made only to steel layers 8 and solder layers 9 (see FIG. 4). Due to the double-wall aspect of the pipe 1, there are now two steel layers 8 and two solder layers 9. Care is taken during the rolling process to ensure that the solder source layer 5 forms the future inner surface of the pipe 1. As a result, after the soldering, an inner solder layer 9 forms the innermost layer of the pipe 1, followed by an inner steel layer 9, followed by an outer solder layer 9, and lastly, followed by an outer steel layer 8. The ends of the metal strip section are joined at a seam 7.

For clarification, this can be readily seen in FIG. 5, in an enlarged illustration of a wall section of the pipe 1. Due to the diffusion of the soldering process, in the exemplary embodiment according to FIG. 5, the nickel in the nickel source layer 4 has diffused into the steel source layer 2 and the solder source layer 5 as well. The clearly delineated layer structure is thus diffused as a result of the soldering, for which reason nickel is then only still present in a basically Gaussian distribution at the boundary surfaces between the steel layers 8 and the solder layers 9. The soldering process forming the basis for FIG. 5 also results in a diffusion of iron and solder atoms in the original nickel source layer 4. For this reason, the term "steel layer" is defined such that there is always a steel layer when the portion of steel is greater than the portion of solder. The term "solder layer" is defined analogously. In all of the regions of the original nickel source layer 4, there are iron and/or solder atoms in the exemplary embodiment in FIG. 5. These regions 10 are assigned to the steel layers 8 or the solder layers 9, and labeled as regions 10 having nickel concentrations increasing toward the boundary surfaces. The boundary surfaces are defined in that the concentration of iron atoms is greater than the concentration of solder atoms on one side thereof.

In the second exemplary embodiment (see FIG. 6), the soldering process is executed with lower thermal energy quantities, such that impurities do not permeate all of the regions of the original nickel source layer 4. In this case, the original nickel source layer 4 remains intact in the form a nickel layers 11 having a 100% nickel concentration. The bordering regions 10 are those regions assigned to the steel layers 8 or the solder layers 9, and at the same time contain nickel. There is a nickel concentration in these regions 10 that increases toward the nickel layers 11. The regions 10 having an increasing nickel concentration and/or nickel layers 11 form regions 21 containing nickel.

Lastly, mixtures of the exemplary embodiments in FIGS. 5 and 6 are also conceivable. By way of example, in some soldering processes, primarily the outer region of the pipe 1 is heated. The diffusion is more strongly pronounced there, accordingly, such that there are no nickel layers 11 in the outer region of the walls 6, but instead, there are more extensive regions 10 having increasing nickel concentrations. In an inner section of the pipe 1, in contrast, the nickel source layer 4 remains intact in the form of nickel layer(s) 11, but thus having lower extents of bordering regions 10.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A multi-walled pipe formed from a multi-layered metal strip having planar sides by rolling, wherein each wall of the pipe comprises a steel layer, wherein at least one side of said steel layer of each wall is coated with a solder layer, wherein the steel layer has a region with nickel concentrations increasing toward the solder layer, and wherein the solder layer has a region of nickel concentrations increasing toward the steel layer, wherein the region with increasing nickel concentrations of the steel layer and the region with increasing nickel concentrations of the solder layer are part of a region containing nickel, and the multi-walled tube thereby comprises the following sequence of layers:
an inner solder layer,
a first region containing nickel,
an inner steel layer,
an outer solder layer,
a second region containing nickel, and
an outer steel layer.

2. The multi-walled pipe according to claim 1, wherein thicknesses of regions containing nickel in the nickel source layer correspond to 40 to 800 nm.

3. The multi-walled pipe according to claim 1, wherein thicknesses of regions containing nickel in the nickel source layer correspond to 60 to 300 nm.

4. The multi-walled pipe according to claim 1, wherein thicknesses of regions containing nickel in the nickel source layer correspond to 70 to 200 nm.

5. The multi-walled pipe according to claim 1, wherein the innermost layer of the pipe is a solder layer.

6. The multi-walled pipe (1) according to claim 1, wherein the outermost of the steel layers has a region having an increasing nickel concentration on its outer surface.

7. The multi-walled pipe according to claim 1, wherein the solder layers comprise copper.

* * * * *